J. R. ROACH.
SPECTACLES.
APPLICATION FILED MAR. 26, 1912.
1,056,370.
Patented Mar. 18, 1913.
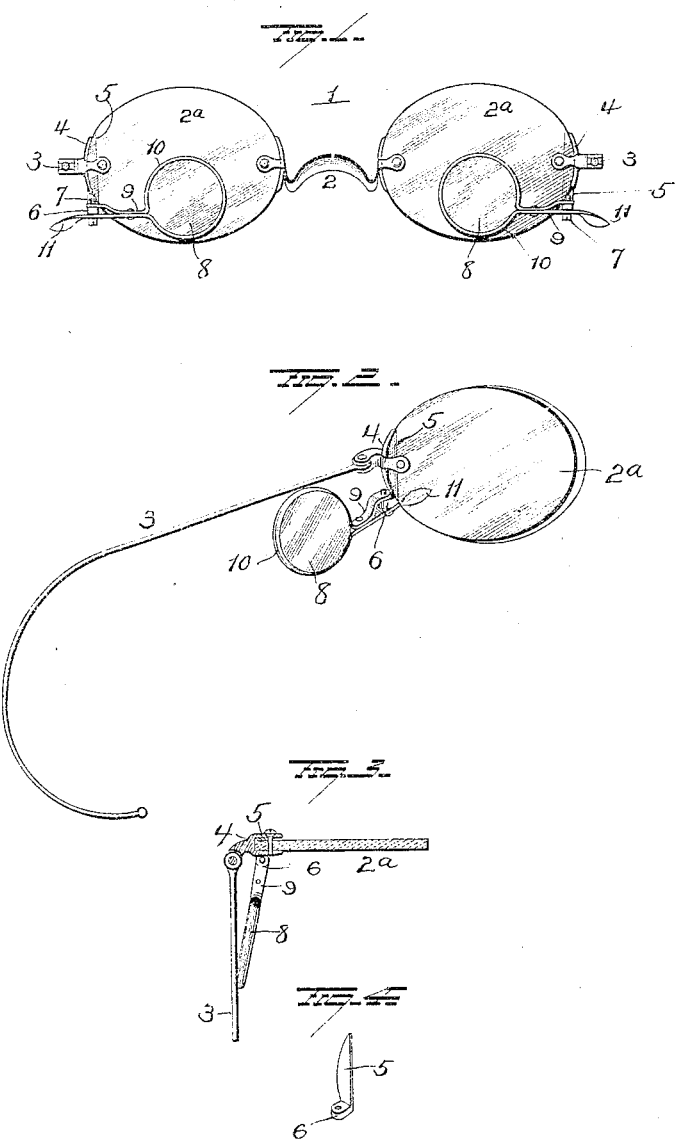
WITNESSES
INVENTOR
J. R. Roach
Attorney

UNITED STATES PATENT OFFICE.

JASPER R. ROACH, OF FAYETTE, ALABAMA.

SPECTACLES.

1,056,370.   Specification of Letters Patent.   Patented Mar. 18, 1913.

Application filed March 26, 1912. Serial No. 686,888.

*To all whom it may concern:*

Be it known that I, JASPER R. ROACH, a citizen of the United States, residing at Fayette, in the county of Fayette and State of Alabama, have invented certain new and useful Improvements in Spectacles; and I do hereby declare the following to be a full, clear, and exact description of the invention, such as will enable others skilled in the art to which it appertains to make and use the same.

This invention relates to improvements in spectacles and more particularly to those of the bi-focal type,—one object of the invention being to provide separate auxiliary or reading lenses and to so mount them on the spectacles that when in use they will not make actual contact with the surface of the distance lenses and so that when they are not in use they can be so disposed as not to conflict with the temples.

A further object is to mount auxiliary or reading lenses on the spectacles in such manner that they can be adjusted for different sized lenses and for difference in contour of the faces of the wearers.

A further object is to mount auxiliary lenses on spectacles in such manner that the shanks which support such lenses will not project appreciably over the surface of the distance lenses.

With these objects in view, the invention consists in certain novel features of construction and combinations of parts as hereinafter described and pointed out in the claims.

In the accompanying drawings, Figure 1 is a view of a pair of spectacles showing the application of my improvements with the auxiliary lenses in position for use. Fig. 2 is a similar view showing the position of the auxiliary lenses when not in use, and Figs. 3 and 4 are detail views.

In the accompanying drawings, I have illustrated my improvements as applied to spectacles of the "rimless" type, but they may be applied to spectacles or to eye glasses having rims or to rimless eye glasses.

1 represents a pair of spectacles comprising distance lenses connected by a nose bridge 2 in the usual manner. Temples 3 are connected with the respective lenses 2ª through the medium of clamps 4 to which said temples are hinged. Each clamp 4 holds in place between itself and the distance lens a shank 5 which is disposed at right angles to the axis of the adjacent distance lens and projects downwardly slightly beyond the edge of said lens where it is provided with an inwardly projecting perforated lug 6. The lug 6 on each shank 5 receives a pivot pin 7 which connects the shank of the frame of an auxiliary lens 8 to said perforated lug. The shank 9 for the auxiliary lens may consist of extensions of the frame 10 of said lens and these extensions are suitably connected together between their pivotal support on the pin 7 and the lens 8. One member of each shank 9 projects beyond the pivotal support of the shank and constitutes a finger piece 11 whereby the auxiliary lens can be operated to move the same to position parallel with the distance lens or away from said lens to a position below the adjacent temple. The shank 9 for each auxiliary lens is so constructed that when said lens is in operative position, said shank will bear against the face of the distance lens in close proximity to the edge of the latter and thus prevent contact of the auxiliary lens or its frame with the distance lens, thus avoiding danger of scratching the latter.

It will be observed that when the auxiliary lenses are in operative positions, the shanks of said lenses do not project across the axial portions of the distance lenses and also that when the auxiliary lenses are not in use, they will be disposed (as shown in Fig. 2) below the temples so that they will in nowise conflict with or crowd the latter.

The shank 5 by which the auxiliary lenses are supported on the distance lenses can be adjusted longitudinally of said shanks so as to be adjustable vertically with relation to the lens by loosening the screws of the clamps 4 and in this manner, the auxiliary lens attachment is adjustable to accommodate distance lenses of different sizes and also to accommodate the contour of the face of the wearer adjacent to the position of the temples.

The rims of the auxiliary lenses may be omitted, if desired and the shanks 9 secured to lenses by any suitable fastening means.

Having fully described my invention what I claim as new and desire to secure by Letters-Patent, is:

1. In bi-focal glasses, the combination with the supporting means for the distance lenses, of shanks secured to said supporting means and disposed at right angles to the axes of the distance lenses, and auxiliary lenses provided with shanks pivotally connected with the lower ends of said first mentioned shanks.

2. In bi-focal glasses, the combination with the distance lenses, of shanks located at the outer ends of said lenses and disposed at right angles to the axes of the latter, movable auxiliary lenses, shanks projecting from said auxiliary lenses and pivotally connected with the lower ends of the shanks on the first mentioned lenses, and finger pieces projecting from the shanks on the auxiliary lenses.

3. In bi-focal glasses, the combination with distance lenses, of shanks at the outer ends of said lenses and having vertically adjustable connection therewith, and auxiliary lenses having pivotal connection with the lower ends of said shanks.

4. In bi-focal glasses, the combination with distance lenses, of shanks secured at the outer ends of said lenses, auxiliary lenses, and shanks pivotally connecting said auxiliary lenses with the lower ends of the first mentioned shanks, the shanks of the auxiliary lenses constructed to prevent contact of said auxiliary lenses with the distance lenses.

In testimony whereof, I have signed this specification in the presence of two subscribing witnesses.

JASPER R. ROACH.

Witnesses:
R. P. McCONNELL,
JAMES H. HYDE.